United States Patent [19]

Horikawa

[11] Patent Number: 4,740,678

[45] Date of Patent: Apr. 26, 1988

[54] AUTOMATIC FOCUS DETECTING DEVICE IN WHICH TWO OBJECTS IMAGES FORMED THROUGH DIFFERENT LIGHT PATHS ARE CONVERTED TO PHOTOELECTRIC SIGNALS

[75] Inventor: Yoshiaki Horikawa, Hachiouji, Japan

[73] Assignee: Olympus Optical Co., Ltd., Tokyo, Japan

[21] Appl. No.: 928,730

[22] Filed: Nov. 10, 1986

Related U.S. Application Data

[63] Continuation of Ser. No. 582,734, Feb. 23, 1984, abandoned.

[30] Foreign Application Priority Data

Feb. 24, 1983 [JP] Japan ................................. 58-28594
Feb. 24, 1983 [JP] Japan ................................. 58-28595

[51] Int. Cl.⁴ ............................................. G01J 1/20
[52] U.S. Cl. ................................... 250/201; 250/204; 354/403; 354/404
[58] Field of Search ................. 250/201, 204, 209; 356/1, 4, 125, 126; 354/402, 404–407, 409

[56] References Cited

U.S. PATENT DOCUMENTS

| | | | |
|---|---|---|---|
| 4,078,171 | 3/1978 | Stauffer | 250/201 |
| 4,373,791 | 2/1983 | Araki | 250/201 PF |
| 4,381,523 | 4/1983 | Eguchi et al. | 354/408 |
| 4,543,476 | 9/1985 | Horikawa | 250/201 PF |
| 4,559,446 | 12/1985 | Suzuki | 250/201 PF |

*Primary Examiner*—Edward P. Westin
*Attorney, Agent, or Firm*—Cushman, Darby & Cushman

[57] ABSTRACT

Method and apparatus for detecting a focus condition for an optical system sequentially forms two images of an object, the images propagating along two different optical paths. The two images are sequentially received with a plurality of photosensitive elements. The photosensitive elements are disposed in a plurality of sections, each section having a plurality of elements, each element outputting a signal corresponding to received light. The element output signals from the first image are stored in a first memory, while the element output signals from the second image are stored in a second memory. A processor calculates the image light contrast for each section from the stored element signals. Then, the section displaying the highest contrast is selected for use in the correlation process. The correlation process is carried out by correlating the stored first image element signals with the stored second image element signals from the selected section. From the correlation process, the focus condition of the optical system is readily determined.

16 Claims, 7 Drawing Sheets

IMAGE DATA A    IMAGE DATA B

AUTOMATIC FOCUS DETECTING DEVICE IN WHICH TWO OBJECTS IMAGES FORMED THROUGH DIFFERENT LIGHT PATHS ARE CONVERTED TO PHOTOELECTRIC SIGNALS

This application is a continuation of Ser. No. 582,734 filed Feb. 23, 1984, now abandoned.

BACKGROUND OF THE INVENTION (a) Field of the Invention

This invention relates to an automatic focus detecting method and apparatus used in such optical systems as microscopes and cameras, and more particularly to an automatic focus detecting method and apparatus wherein two images formed through different light paths are respectively converted to photoelectric output signals by a photoelectric converting device made by arranging many elements. The relative positional relationships between the two images are detected on the basis of the photoelectric output signals to detect the focus state of the optical system.

(b) Description of the Prior Art

Among conventional automatic focus detecting devices of this kind, there are the range finder type (wherein a trigonometric measurement is applied) and a TTL system (wherein a light pencil passing through a pupil is divided to obtain two images). In either of these systems, correlation of two images is digitally determined to detect the coincidence of the two images. Coincidence is indicated when a correlative value between the two images reaches a maximum. The relative movement of the two images is indicated by the phase differences between the images.

Figure 1:
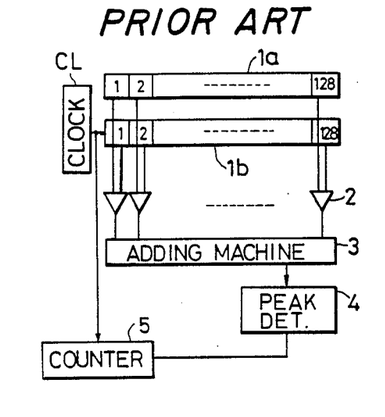
FIG. 1 is a view showing the circuit of a conventional automatic focus detecting device.

FIG. 1 shows an example of such conventional automatic focus detecting devices. The data A and B of two images picked up by an image sensor (not shown) are memorized respectively in ring-shaped shift registers 1a and 1b through a sample holding circuit, A-D converter (not shown), etc. In this example, the image data are formed of 128 elements.

When both image data A and B are addressed respectively in the shift registers 1a and 1b, then the absolute values of the differences of the respective elements will be determined by circuits 2 which determine the absolute values of the differences between the signals. Furthermore, the sum of the absolute values will be determined by an adding machine 3 to obtain the correlative value of two images. Then, the image data B of the shift register 1b will be shifted by 1 element by a pulse from a clock CL and again the correlative value will be determined by the circuit 2 and adding machine 3. Thus, whenever the image data on one hand are shifted in turn by the clock CL, the correlative value will be determined. In addition, the maximum value of the correlative value will be determined by a peak detector 4, and the position in which the maximum value is detected will be the in-focus position. Also, the clock pulse number of the maximum value will be determined by a counter 5. This clock number, (that is, the shifting amount of the image data B of the shift register 1b) will denote the phase difference between the two images, and the direction and amount of de-focus will be derivable from the known phase difference.

Figure 2A:
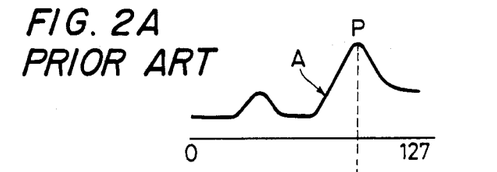
FIGS. 2A, 2B and 2C are views showing examples of image data to be stored respectively in the shift registers of the above-mentioned conventional example.
Figure 2B:
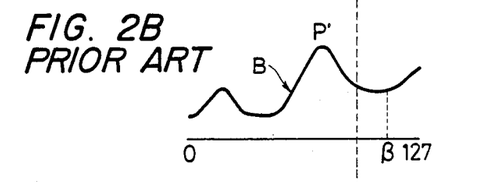
Figure 2C:
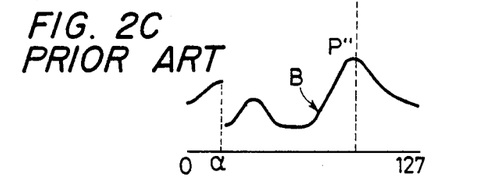

However, in this conventional device, since the image sensor has a fixed size, not only must the two images formed on the image sensor shift positions, but also the end portions of the images will be different. As a result, the image data A and B memorized in the two shift registers 1a and 1b will not only shift in position, but will also be different in their end portions. Thus, as the correlation is computed while circulating these image data in turn, no accurate phase difference of the image can be determined. This point will be explained in detail with reference to FIGS. 2A to 2C. FIGS. 2A and 2B show respectively the image data A stored in the shift register 1a, and the image data B stored in the shift register 1b. When not in-focus, the image data A and B will not coincide with each other; therefore the peaks P and P' will not coincide with each other and both image data A and B will be different at their end portions. FIG. 2C shows the image data B of the shift register 1b which have been shifted by $\alpha$ pieces of the image element. In this case, as the peaks P and P" coincide with each other, the phase different of both image data A and B will be found to correspond to $\alpha$ pieces of the image element. The portion from 0 to $\alpha$ of the image data shown in FIG. 2C corresponds to that portion of the B data from $\beta$ to 127 shown in FIG. 2B. Therefore, the image data of FIGS. 2A and 2C do not perfectly coincide with each other. That is to say, if the correlations of all the image data of the numbers 0 to 127 of the image elements are computed, when the image phase difference is zero (that is, when the peaks P and P" coincide with each other), the correlative value will not always be an extreme or threshold value. Therefore, in this device, it is difficult to determine an accurate image phase difference.

Also, in this known device, as the image data are moved by only one image element at a time, detecting a large de-focus will take too much time.

Further, if the pitch of the elements of the image sensor is made small to obtain focusing precision, or if the number of the elements of the image sensor is reduced to improve operational speed, the range of the image sensor will become so narrow that the object will have to be brought to a limited narrow part in the visual field. On the other hand, if the range of the image sensor is made wide, the number of sensor elements will become so large that the operational time will be much longer.

SUMMARY OF THE INVENTION

In view of the above mentioned circumstances, a primary object of the present invention is to provide an automatic focus detecting method and apparatus capable of greatly improving the focusing precision and detecting speed without complicating the conventional system.

According to the present invention, this object is attained by providing an image forming lens; a pupil divider arranged rotatably in the vicinity of the pupil of the image forming lens and having a light passing part thereon; a photoelectric converting means made by arranging many sensor elements and capable of receiving two object images formed by the image forming lens and pupil divider, for converting the two object images respectively to photoelectric output signals; and a detecting circuit means connected to the photoelectric converting means, for detecting the relative positions of the two object images on the basis of the photoelectric output signals from the photoelectric converting means, and for arranging the images so that their relative positional relationship is detected by deleting usable photoelectric output signals from selected portions of the many sensor elements of the photoelectric converting means.

According to a preferred formation of the present invention, the photoelectric converting means has a size capable of covering a large part of the visual field.

According to another preferred formation of the present invention, the relative positional relationship of the two object images is detected by using photoelectric output signals from paired elements which are separated from each other by a plurality of other sensor elements when the calculated de-focus amount between the two object images is larger than a predetermined value.

This and other objects of the present invention will become more apparent from the following detailed description and appended claims.

DESCRIPTION OF THE PREFERRED EMBODIMENTS

Figure 3A:
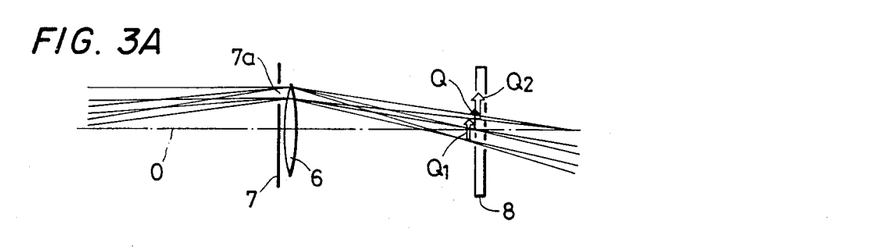
FIGS. 3A and 3B are respectively views showing the principle of a pupil dividing method used in an embodiment of the automatic focus detecting device according to the present invention.
Figure 3B:
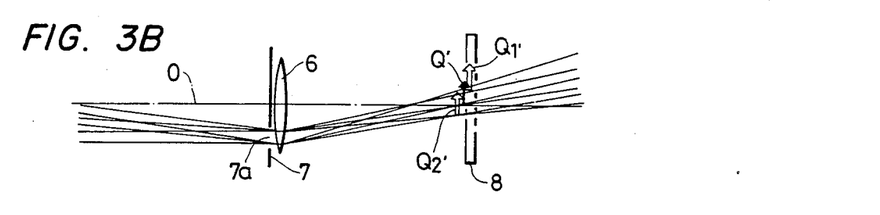

The present invention shall be explained on the basis of the embodiment shown in FIGS. 3A to 15. FIGS. 3A and 3B show the principle of the pupil dividing method used in this embodiment. In FIG. 3A, the reference numeral 6 denotes an image forming lens, 7 denotes a light intercepting plate having an aperture 7a arranged near a pupil on the front side (object side) of the image forming lens 6, and 8 denotes an image plane. When in focus, an image Q will be formed on the image plane 8 but, when out of focus, obscure images $Q_1$ and $Q_2$ will be formed on the image plane 8 respectively in the positions shifted in a reverse direction, perpendicular to an optical axis 0 with respect to the image Q, depending on whether the focal point is on the front side or the rear side of the image plane 8. FIG. 3B shows the case where the aperture 7a of the light intercepting plate 7 is moved to the reverse side with respect to the optical axis 0. When in focus, an image Q' will be formed on the image plane 8 but, when out of focus, obscure image $Q_1'$ and $Q_2'$ will be formed on the image plane 8 depending on whether the position of the focal point is on the front side or the rear side of the image plane 8. Therefore, if the aperture 7a of the light intercepting plate 7 is moved, for example, from the position in FIG. 3A to the position in FIG. 3B, when in focus the images Q and Q' will not move. However, in case the position of the focal point is on the front side of the image plane 8, the image will move from the position $Q_1$ to the position $Q_1'$. In case the position of the focal point is on the rear side of the image plane 8, the image will move from the position $Q_2$ to the position $Q_2'$. If a so-called image sensor is provided on the image plane 8, the state of the image will be able to be measured.

From the above, the determination of whether the position of the focal point is on the front side or the rear side of the image plane 8, and the amount of the shift of the position of the focal point can be known from the direction and amount of the movement (that is, the phase difference) of the image.

Figure 4:
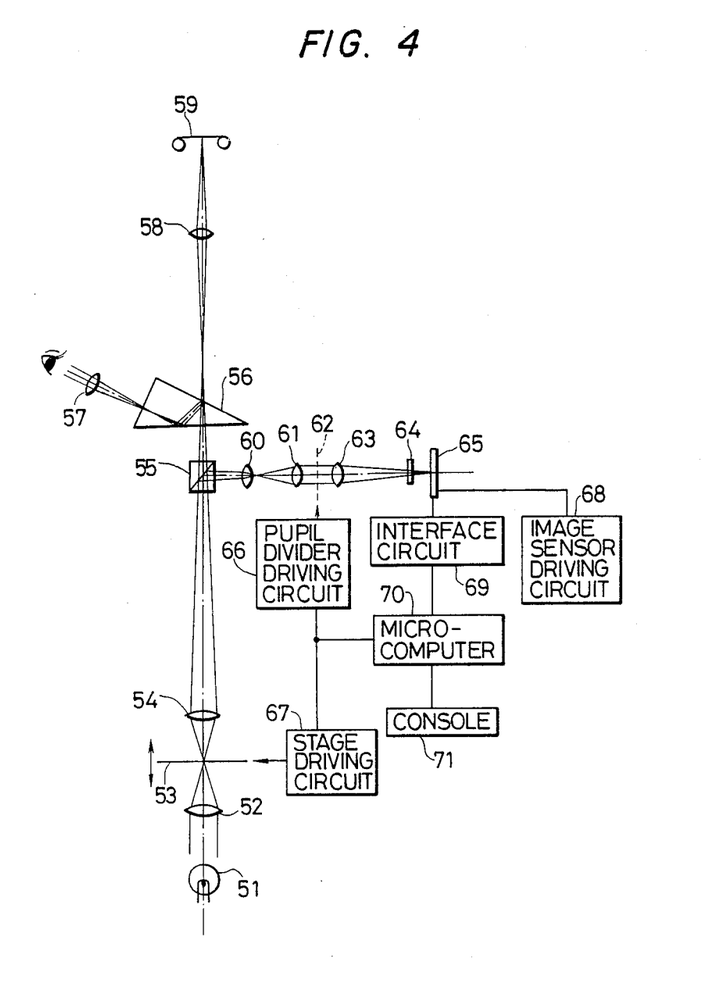
FIG. 4 is a general view of the embodiment of the present invention.

FIG. 4 shows an example in which the above mentioned principle is used in a microscope. Here, the reference numeral 51 denotes a light source, 52 denotes a condenser lens, 53 denotes a stage on which a sample is to be placed and observed, 54 denotes an objective lens, 55 denotes a beam splitter for leading the light from the light source 51 to a focus detecting optical system, and 56 denotes a prism for leading a part of the light to an eyepiece. 57 denotes the eyepiece, 59 denotes film, 60 denotes a relay lens for leading the light from the beam splitter 55 to the focus detecting optical system, 61 denotes a lens for making a pupil, 62 denotes a pupil divider to be located in the position of the pupil made by the lens 61, 63 denotes an image forming lens for making the light passing through it form an image on a photoelectric converting means or image sensor 65 through a filter 64, 66 denotes a pupil divider driving circuit, 67 denotes a stage driving circuit respectively controlled by a microcomputer 70, 68 denotes an image sensor driving circuit, 69 denotes an interface circuit for putting image data from the image sensor 65 into the microcomputer 70, and 71 denotes a console for providing automatic focus, an in-focus indication, and an impossibility indication.

The microcomputer 70 carries out all of the correlation operations and in-focus determinations. A recently developed and marketed LSI (used solely for computation) may be used for the correlation operation.

Figures 5A, 5B, 6, 7:
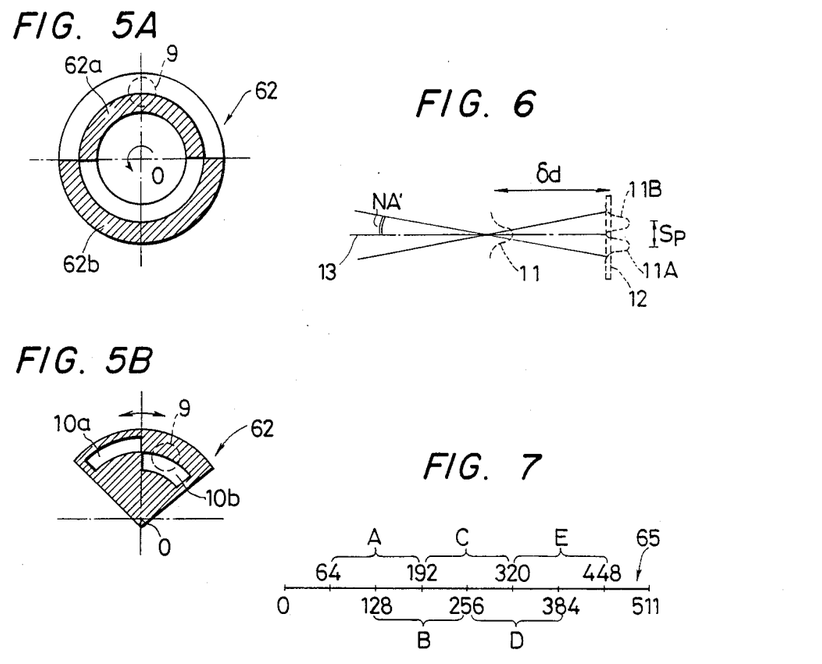
FIGS. 5A and 5B are front views showing concrete examples of pupil dividers used in the embodiment shown in FIG. 4.
FIG. 6 is a view showing the phase difference amount and de-focus amount between two images.
FIG. 7 is a view showing an image sensor of the embodiment shown in FIG. 4, and a processing method therefor.

The operations of the respective parts shall be described in detail in the following. FIGS. 5A and 5B show two concrete examples of the pupil divider for dividing a light beam passing through the pupil into two images. That is to say, FIG. 5A shows a pupil divider wherein semi-circular arcuate light intercepting parts (hatched parts) 62a and 62b are provided on a transparent glass disk so that, when the disk is rotated around an axis 0, the halves of the pupil 9 will be alternately opened and closed. FIG. 5B shows a sector pupil divider having two arcuate apertures 10a and 10b so that, when the sector is reciprocally rotated around the axis 0, the halves of the pupil will be alternately opened and closed. The structure of FIG. 5A is adapted to a method wherein an image is picked up by the image sensor 65 in response to a signal synchronized with the rotation of the pupil divider while the pupil divider 62 is being rotated. FIG. 5B is adapted to a method wherein an image is picked up by the image sensor 65 in synchronization with the movement of the pupil divider 62 driven by a controlling device such as a microcomputer. Thus, with the pupil divider 62 as described above, the conditions shown in FIGS. 3A and 3B can be made, and the image data in the respective conditions can be received by the image sensor 65.

Further, generally, the object or sample to be focused is not always in the center of the visual field. Therefore, it is desirable that the image sensor 65 covers not only the center of the visual field but also a range as wide as possible. However, if the entire visual field is to be covered, the number of the elements of the image sensor will have to be increased, because, in order to keep the focusing precision constant, the pitch of the elements must be kept within a predetermined spacing. This point will be explained in the following.

FIG. 6 is a view showing the phase difference amount and the de-focus amount between two images. Here, in order to simplify the explanation, a spot image shall be considered. The reference numeral 13 denotes the optical axis of an optical system. It is assumed that a spot image 11 is formed by the optical system wherein the numerical aperture of the exit side is NA'. Now, if the image sensor 12 is in the position of a de-focus amount δd, two images 11A and 11B will be formed with a phase difference Sp, and therefore the relationship of δd to Sp will be:

$$\delta d = Sp/NA' \quad (1)$$

Now, the focusing precision in the case of using a 10× objective lens shall be considered. If the numerical aperture of the 10× objective lens is 0.40, the numerical aperture NA' will be 0.04 and the quantity $$\delta d = 25 Sp \quad (2)$$

will be derived from the formula (1). On the other hand, the focal depth t, of the 10× objective lens is represented by:

$$t = \epsilon/NA' \quad (3)$$

(wherein $\epsilon$ is a permissible circle of confusion). Therefore, if $\epsilon = 0.05$ mm (corresponding to a resolving power of 20/mm), $$t = 1.25. \quad (4)$$

As a focusing precision within this focal depth is required, if $$\delta d = t/2 \quad (5)$$

is given, $$\delta d = 0.625 \text{ mm} \quad (6)$$

will be obtained and $$Sp = 26 \ \mu m \quad (7)$$

will be obtained.

In order to obtain this phase difference amount to a high precision, it is necessary that the pitch of the diodes in the array of the image sensor 12 should be about 25 μm. As in the above, the pitch of the diodes of the image sensor 12 is determined in response to the required focusing precision. In this case, if an image sensor having 128 diodes is used, the range which the image sensor 12 can cover will be 128×0.025=3.2 mm which will be so much smaller than the visual field number 21 (visual field of a diameter of 21 mm), that focusing will have to be accomplished by moving the object to be focused to the position (generally the center) of the image sensor.

FIG. 7 shows the image sensor to be used in this embodiment, and a method of processing image data picked up. That is to say, in this embodiment, an image sensor 65 having 512 photodiodes is used. According to this image sensor, an image sensor range of 512×0.025=12.8 mm will be obtained, and a considerable part of the visual field can be covered. If the correlation operation is performed by using all the elements (diodes), the operational time will be very long. Therefore, 512 diode elements are divided into five sections A to E, each of 128 diode elements, and the correlation operation is performed in the section having the highest contrast.

Now, an example of the contrast computing method shall be explained. Generally, as an evaluating function for evaluating the contrast (where f(x) denotes an output of the x th element of the sensor 65), $$C = \sum_x |f(x) - f(x + 1)| \text{ or} \quad (8)$$

$$C = \sum_x (f(x) - f(x + 1))^2 \quad (9)$$

is known. In the case of this embodiment (as different from focusing by a contrast method wherein it is required to know the variation of the contrast with high precision), the relative contrast intensity between the respective sections may be known and therefore it is not always necessary to compute the difference between the outputs of two adjacent elements. For example, if $$C = \sum_x{}' |f(x) - f(x + 5)| \quad (10)$$

(wherein $$\sum_x$$

signifies the computation of every four elements), the computation of the section A correlation will be:

$$C = \sum_{x=64}^{184}{}' |f(x) - f(x + 5)| \quad (11)$$
$$= |f(64) - f(69)| + \ldots + |f(184) - f(188)|$$

The absolute value of the difference may be added 31 times while being computed. In the conventional, non-sectional computing method, it must be added 121 times.

Figure 8:
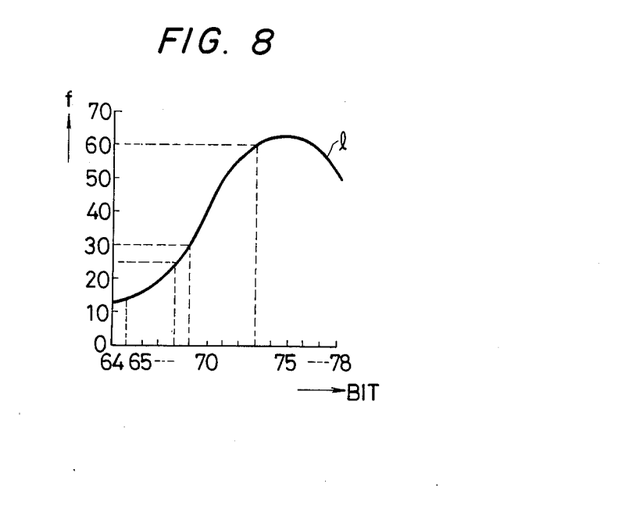
FIG. 8 is a view showing an example of the light intensity distribution on the image sensor.

By the way, the absolute value of the difference between the values of a pair of elements in positions separated by 5 elements from each other is computed every 4 elements in order to make the sensitivity of the contrast higher than that achieved by merely computing every 4 elements the absolute value of the difference between the values of a pair of elements adjacent to each other. In this respect, for example, in the case of this embodiment, the comparative computation on the basis of the light intensity distribution 1 on the image sensor shown in FIG. 8 is:

$$C = |f(64) - f(69)| + |f(68) - f(73)| \quad (12)$$
$$= |13 - 30| + |25 - 60|$$
$$= 52$$

but, in the conventional case, it is $$C' = |f(64) - f(65)| + |f(68) - f(69)| \quad (13)$$
$$= |13 - 14| + |25 - 30|$$
$$= 6$$

Thus, the contrast sensitivity in the case of this embodiment is higher than in the conventional case.

Further, in order to reduce the computation amount, the difference between the values of a pair in the positions separated by X elements from each other is determined and is computed every Y elements, $X > Y$ will be preferable. This embodiment is of $X = 5 > 4 = Y$.

By the way, the data to be used for the above mentioned function f may be either of the image data A and B.

Thus, the contrasts of the sections A, B, C, D and E are computed by the method described above and the best contrast among them is selected. However, here, as evident from FIG. 7, the sections A and B overlap with each other in elements 128 to 192. Therefore, in order to avoid useless computations, the contrasts of elements 64 to 128, elements 128 to 192, and elements 192 to 256 may be respectively computed. The contrast of the section A may be made as the sum of the contrasts of elements 64 to 128 and elements 128 to 192 and the contrast of the section B may be made by the sum of the contrasts of elements 128 to 192 and elements 192 to 256. By the way, the sections A, B, C, D and E respectively overlap with one another by half so that, even in case there is a part in which the image intensity variation is extreme on the boundary between the sections, the sections including the variation can be designated. For example, in case there is a part in which the image intensity variation is extreme on the boundary between the sections A and B, that is, near the element 192, all the information will not be able to be used in the section A or C. However, if the section B is designated, all the information will be well included in the section B. The time required for determining the contrast may be shorter than the time required for the correlation operation so that the operational time of this embodiment may be reduced to the correlation operation time of only the 128 elements + about the time α. Further, sections are not formed respectively for 64 elements on both sides so that, in case of computing the correlation by shifting the images, what is described in FIG. 2 may not occur.

When the processing is performed as in the above, even if the object or sample to be focused is not always in the center of the visual field, the part (section) in which the image of the object is located will be automatically selected and the focus will be detected. For the above, it is not necessary to determine a specific section, and a portion including those photodiodes which are required for the correlation operation may be selected by contrast, or the like, from among the many photodiodes of the image sensor which are arranged to cover the greater part of the visual field. Also, a mark or the like may be provided in the visual field so as to be manually set. Thus, even if a cubic sample or dust is in the visual field, the object desired to be focused will be able to be focused.

The entire operation shall be explained in the following. First of all, the two image data A and B from the image sensor 65 in FIG. 4 are stored in the memory of the microcomputer 70 through the interface circuit 69. The section highest in contrast is selected from among the five sections, and correlation is carried out using the image data from the selected section. It is now assumed in the explanation that the section A in FIG. 7 is selected.

The correlation operation is performed by shifting, by one element at a time, the image data A and B stored in the memory to obtain overlap. The phase difference is determined by ascertaining how many elements the image data must be shifted to obtain overlap. The correlation formula is, for example, $$R(\delta) = \sum_{x=64}^{191} ABS \{f_A(x) - f_B(x + \delta)\} \quad (14)$$

where ABS represents an absolute value and the functions $f_A(x)$ and $f_B(x)$ respectively represent the values of the x th element of the image data A and B. On a set of the functions $f_A$ and $f_B$, $\delta$ ($\delta'$ when $\delta$ is varied until $R(\delta)$ becomes minimum) is made the phase difference. Also, in this example, $-64 \leq \delta \leq 64$. The range of $\delta$ can be made so narrow near the in-focus point that the operational time becomes very short.

Figure 9:
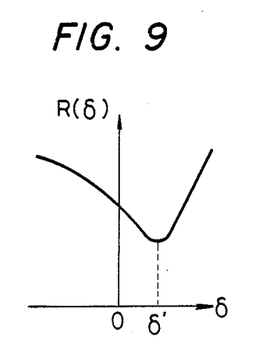
FIGS. 9 and 10 are, respectively, views showing a phase difference computing method high in precision near the in-focus point.
Figure 10:
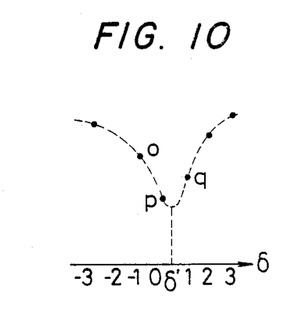

The actual value of $\delta$ takes only the value of each element o the image sensor. Therefore, in order to detect the focus more precisely, a discrete value of the correlation is approximated with a curve fitting or the like to determine the phase difference between the images with a precision less than 1 element (FIG. 9), or a secondary curve can be approximated by using $\delta$ ($\delta'$ when $R(\delta)$ is minimum), and three points o, p and q in front and behind $\delta'$ to determine the phase difference (FIG. 10).

As a result of the above, the operational time may be slightly increased while covering the greater part of the visual field and maintaining focusing precision.

In the above mentioned example, as $\delta$ is in the range of $-64$ to 64, the de-focus amount in this range will be $0.625 \times 64 = 40$ mm from the formula (6), and will be $40/10^2 = 0.4 = 400$ μm on the objective side. Therefore, the de-focus amount will be $\pm 400$ μm. In case a defocus amount in a range wider than the range of $-64$ to 64 is to be put into the detecting range, it will be possible to increase the range of $\delta$, but it is not preferable because then the computation range will increase. Further, in case the de-focus amount is very large, even if highly precise computation as mentioned above is performed, there will be no significant increase in operational time.

Therefore, in this embodiment, the contrast and correlation are computed by using only the data of several elements within all the image data taken in. Concretely, it may be considered that, if data are to be used from every 5 elements, f(0), f(5), f(10), ... f(505), f(510) from among the data f(0), f(1), f(2), ... f(510), f(511), only limited data will be used. Practically, only data from every 5 elements are used for the computation. For example, the formula (14) will be:

$$R(\delta) = \sum_{n=0}^{64} |f_A(96 + 4n) - f_B(96 + 4n + \delta)| \quad (15)$$

In this case, the de-focus amount will be so large and the image will be so obscure that there will be only low frequency components and therefore the block will not be divided. However, in this case, the section may be divided if necessary. The variation amount of δ in this case is computed every 5 elements. Therefore, even in case the range of δ is made, for example, $-200 \leq \delta \leq 200$, the correlation computations may be so few, such as 81 times. The detecting range will be ±1.25 mm.

As in the above, when the image data are used every several elements, the detecting range will be widened without increasing the amount of computation required. Thus, when the de-focus amount is large, if the focal point is brought near the image plane by the computation of data from every several elements, and then the computation with the above described precision is performed, automatic focus detection will be able to be carried out over a wider range and with a higher precision.

Further, in case the de-focus amount is large, the stage may be moved while computing only the contrast from the image data, and when the contrast reaches a predetermined value, focusing by correlation may be performed. In this case, if the contrast is not greater than the predetermined value, the correlation computation will be likely to compute a wrong image phase. Therefore, this predetermined value may be used as a judging criterion for determining whether the correlation should be computed or not.

By the way, it is needless to say that, in the case of a focusing device which moves the objective optical system, the optical system should be arranged so as to be driven.

Figure 11:
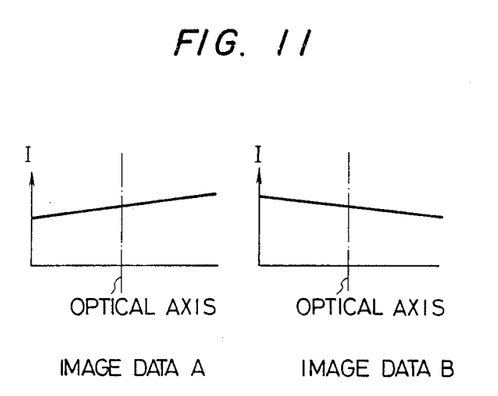
FIG. 11 is a view showing the unevenness of the light intensity of the image data in the above-mentioned FIG. 4 embodiment.
Figure 12A:
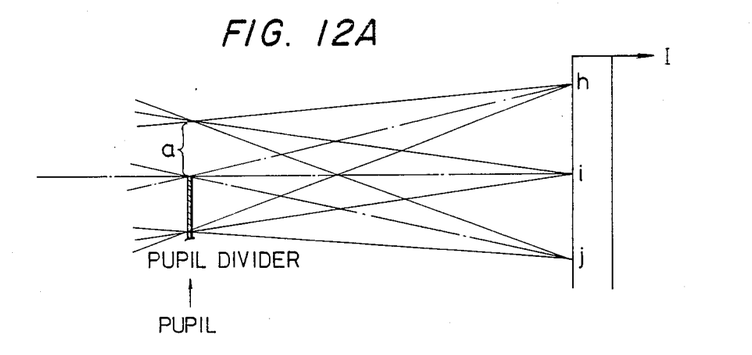
FIGS. 12A and 12B are, respectively, views for schematically explaining the unevenness of the light intensity.
Figure 12B:
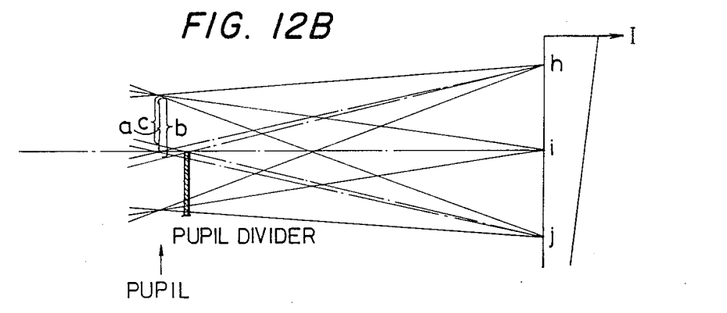

In the case of the above mentioned embodiment, as the light beam passing through the pupil is divided to obtain two images, in some cases the light intensities of the image data A and B may be different from each other due to the eccentricities of the optical system and/or pupil. Particularly, if the focusing system is of an attachment type, trouble will be likely to occur. Further, in case the pupil divider is not in the pupil position, the light intensities of the image data will be uneven as in FIG. 11. FIGS. 12A and 12B are views for schematically explaining such uneven light intensities. In the case of FIG. 12A, as the pupil and pupil divider coincide with each other, for the respective image heights h, i and j, the light intensities passing through the pupil are all equal to a. In the case of FIG. 12B, as the pupil and pupil divider do not coincide with each other, for the respective image heights h, i and j, the light intensities passing through the pupil will be respectively b, a, and c and will be non-uniform and light intensity unevenness will be produced.

If there is a light intensity difference and a light intensity unevenness as in the above, the similarity of the two images represented by the image data A and B will deteriorate and the focusing precision will be reduced as a result of the correlation processing. Therefore, correction will be required in this case. An example of a correcting method is a method often used to remove the fixed pattern noise of the image sensor. It is a method wherein the image sensor is exposed to a uniform light in advance to obtain image data. If the incident light is uniform, the image data will become a fixed pattern of noise itself. Therefore, if a correction coefficient is made from the reciprocal of the image data, then the influence of the fixed pattern noise will be able to be removed by multiplying the image data by the correction coefficient. In the case of this embodiment, if the image data A and B are obtained with a uniform light passed through the focusing optical system, the image data A and B will become data having uneven light intensities as in FIG. 11 due to eccentricity or the like. Therefore, if the correction coefficient is the reciprocal of the noise pattern image data and the same processing is performed, the influence of light intensity unevenness will be removed. Even in the case where there is a light intensity difference, if the same processing is performed the same beneficial effect will be obtained. Also, the fixed pattern noise of the image sensor will be removed. As a concrete method of exposing the image sensor to a uniform light, the method wherein the image data are put in while no sample is placed on the stage 53 is simple.

Figure 13:
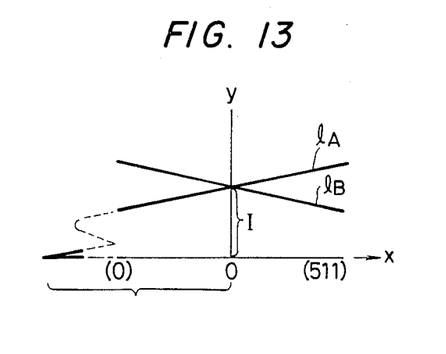
FIG. 13 is a view showing a method for correcting the unevenness of the light intensity.

As in the above, in the above mentioned correction steps, it is necessary to put in data once having a uniform light intensity. This is not a troublesome operation. However, in case the uniform light cannot be put in, the correction can be carried out by computation. FIG. 13 is a view for explaining such a computed correction method wherein the x-axis is arranged in the direction of the sensor array, and the y-axis is arranged in the direction of the intensity of the image data. As understood from the explanation of FIG. 11, the values of the image data A and B can be considered to be a straight line having a fixed gradient. Now, if the values of the image data A and B are respectively $l_A$ and $l_B$, the gradient of the value $l_A$ of the image data A is $\beta_A$, and the average value of the value $l_A$ is $I_A$, the formula relating to the image data A will be:

$$y = \beta_A x + I_A \quad (16)$$

Here, the gradient $\beta_A$ varies with the light intensity but can be determined from a constant K by defining the constant K as follows: $\beta_A = I_A/K$. The constant K will be determined by the characteristics of the optical system and may be measured in advance. If the average of the light intensities of the image data A and B is $I_{all}$, the correction coefficient α will be:

$$\alpha = \frac{I_{all}}{\frac{I_A}{k} x + I_A} = \frac{I_{all}}{I_A} \cdot \frac{1}{\frac{x}{K} + 1} \quad (17)$$

Thus, the light intensity difference and light intensity unevenness can both be corrected.

As in the above, the influence of the eccentricities of the optical system and/or the pupil, and the infuence of the non-coincidence of the positions of the pupil and pupil divider, can be corrected and removed by using a uniform light or by computation. As a result, focusing precision will be improved and the detecting range will be extended. Furthermore, the in-focus detecting unit can be embodied in an attachment compatible to existing equipment. The greatest effect is that various kinds of objective lenses of various magnifications and different in pupil positions can be used.

Figure 14:
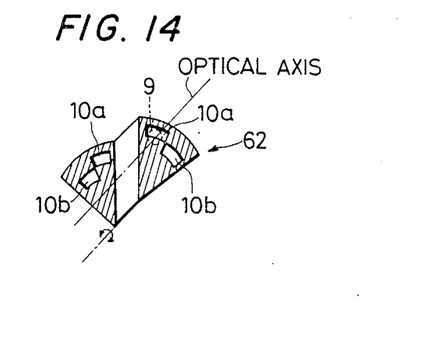
FIG. 14 is a perspective view of another pupil divider.

If many kinds of objective lenses such as those used in microscopes, the pupil position will be different with each respective objective lens and therefore it will be difficult to correctly set the pupil divider in the pupil position for all the objective lenses. As a solution to this difficulty, the present invention proposes a method wherein respective pupil dividers are provided in the pupil positions of the respective objective lenses. It is needless to say that, in this case, the construction is made so that, while one pupil divider is being used, the other pupil dividers never block the light passing through the pupil. For example, as shown in FIG. 14, two of the same pupil dividers as are shown in FIG. 5B may be used and connected with each other.

In FIG. 4, the filter 64 is an infrared filter or a band pass filter and is used to prevent the shift of the focal point by reason of spectrum sensitivity and spectrum distribution of the image sensor 65 and light source being different from the luminous efficiency.

Figure 15:
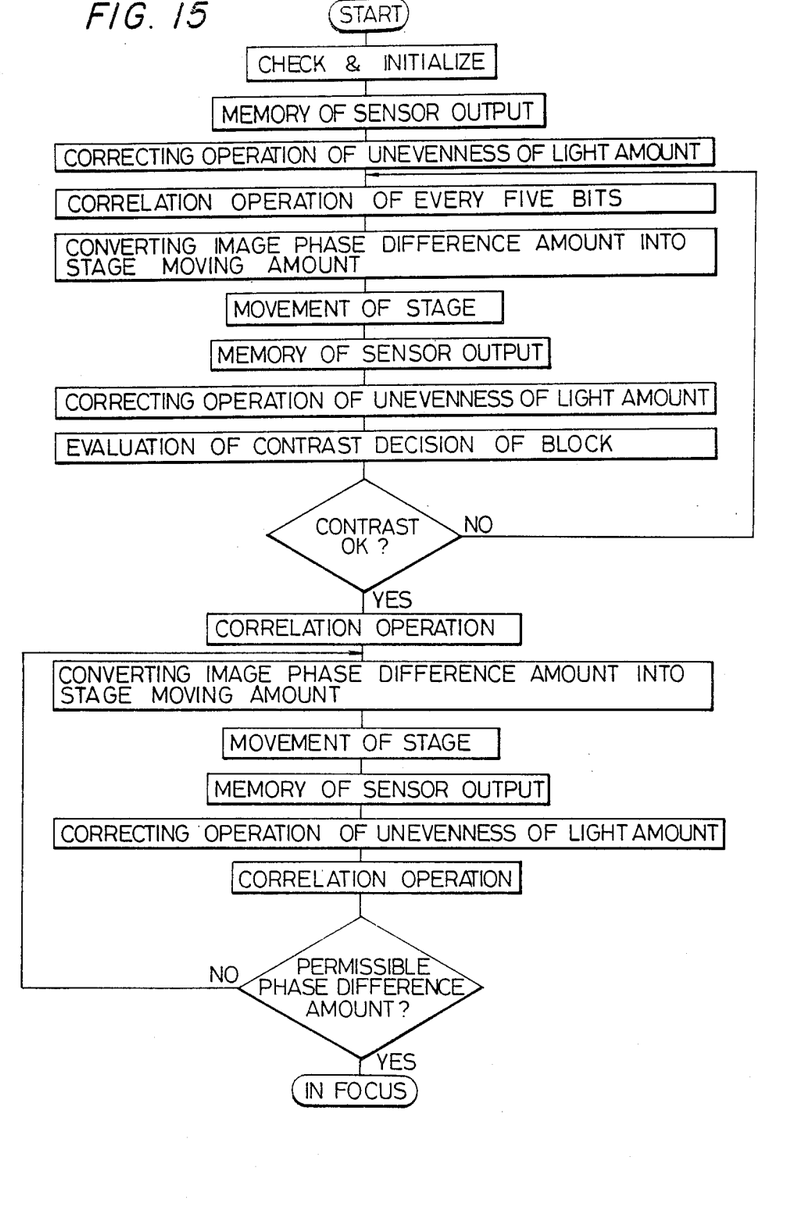
FIG. 15 is a flow-chart showing a method of control and the operational process by the computer of the above-mentioned FIG. 4 embodiment.

In the case of the automatic focusing device and method as described above, the method using a microcomputer and an operation processing unit is easiest to design and cheapest to manufacture. In this respect, an additional explanation will be made with the flow-chart in FIG. 15 showing the most fundamental case. When the focusing operation is started, first of all, whether the microscope is the kind adapted to be automatically focused is checked, and the type and magnification of the objective lens are determined. In the case of correcting light intensity unevenness, the parameters will be different depending on the kind and magnification of the objective lens used since the conversion coefficient which converts the phase difference to to the movement of the stage will be different depending on the magnification (see the formula (1)). Next, the data of the functions $f_A$ and $f_B$ are obtained from the image sensor and are stored in the memory. After this, the correction of the light intensity unevenness is performed and the data are stored again in the memory. Since the image may be largely out of focus when the focusing operation is started, the focus position is approximately determined by the correlation computation of every five elements (see the formula (9)). Then, the phase difference amount between two images determined by the correlation is converted to a moving distance for the stage and the stage is moved. Then again the data of the functions $f_A$ and $f_B$ are obtained and the correction is performed. Then the section of sensors to be used is determined by the contrast evaluation. Unless the contrast is above the predetermined value, the reliability of the result of the correlation process will be low. Therefore, once again, the 5-element correlation is performed to make the stage approach the focus position. Even if such operation is effected several times, in case the contrast does not increase, the contrast of the sample will be too low and therefore an impossibility indication will be supplied. If the contrast is above the predetermined value, the correlation will be computed in the selected section and the stage will be moved to the in-focus position. To confirm the in-focus state, once again the functions $f_A$ and $f_B$ are obtained and the correlation is computed. Here, if the phase difference between two images is of a value within the focal depth, the image will be in focus and the stage will no longer move. If it is not within the focal depth, once again the same operation will be repeated.

The above is an explanation of the most fundamental operation. Safety measures for failures (as in the case where there is no sample or in the case where the device fails) are considered in the actual program of the preferred embodiment.

Also, the phase difference between two images may be used to determine the change-over from the 5-element correlation to the 1-element correlation. Though the range of $-200 \leq \delta \leq 200$ is computed every 5 elements in the case of the above example, if $\delta$ at which the correlation $R(\delta)$ takes the minimum value is $-200 \leq \delta' \leq 200$, the 1-element correlation will be performed after the stage has moved out of that range. In this case, the judging condition had better be set to be rather small by the range of $\delta$ computed to be $-180 \leq \delta' \leq 180$, because, in case the de-focus amount is large, $\delta$ taking the minimum value may be determined by mistake due to noise or the like.

Figure 16:
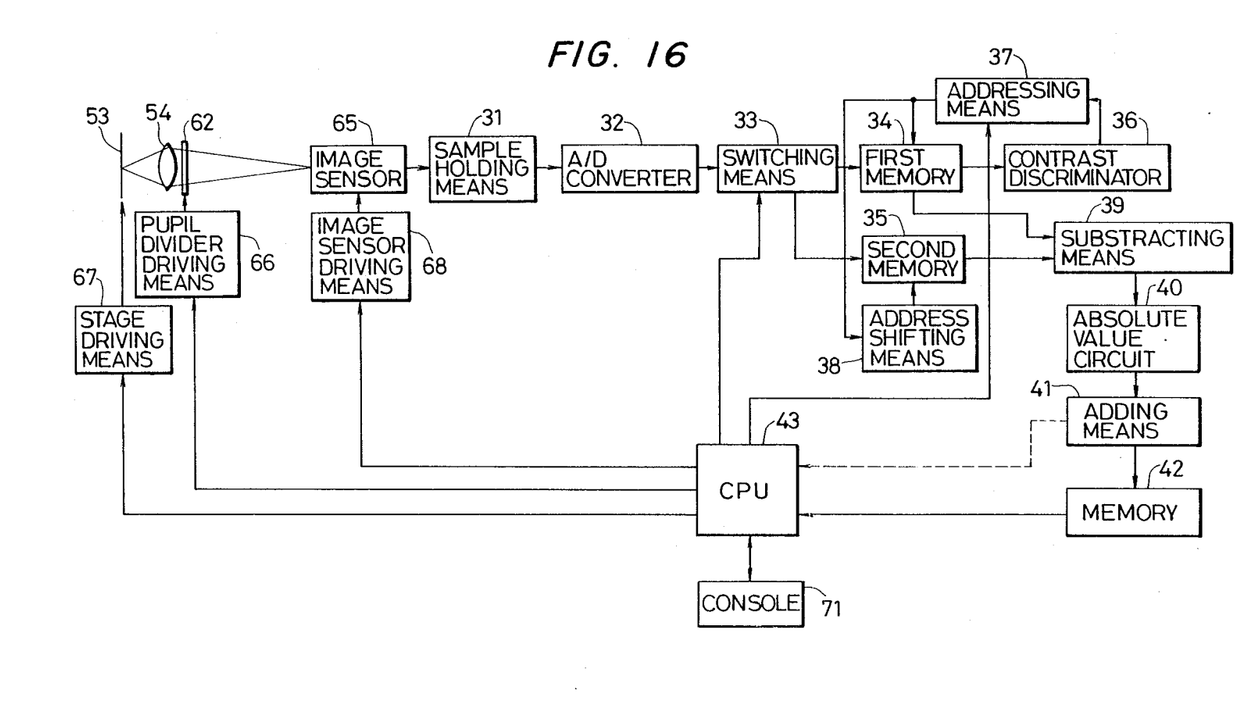
FIG. 16 is a block diagram showing a control and operations circuit of another embodiment of the present invention.

FIG. 16 shows the control-operation circuit of a second embodiment wherein units other than the central processing unit are formed of hardware. This will be explained in the following. First of all, the pupil divider driving means 66 works with the focusing starting signal from the console 71 and the image data A are obtained by the image sensor 65. The image sensor 65 starts picking up the images by means of the image sensor driving means 68 in synchronization with the pupil divider 62. At this time, in case the image sensor 65 is an accumulating type image sensor (generally, a solid state pickup device belongs to this type), a vacant read-out is performed to erase previously accumulated signals. The image data A continuously read out of the image sensor 65 is stored in a first memory 34 through a sample holding means 31, A/D converter 32 and switching means 33. Then the image data A are corrected by the correction coefficient data stored in advance in a memory (not shown) and are again stored in the first memory 34. The correction coefficient data are supplied by multiplying the reciprocal numbers of the above-described image data (picked up in advance by the image sensor when a uniform light is incident thereon) by the average value of the image data A and B obtained. Now, the case of the image sensor consisting of 512 elements shall be considered. The image data A and B consists of 1024 picture elements over 0 to 1023 elements. The image data A and B will be obtained respectively from the 0 to 511 elements and from the 512 to 1023 elements. If the value of the n th element of the image data obtained with the uniform light is $X_n$, the correction coefficient $k_n$ of the n th element will be $$k_n = \frac{\sum_{n=0}^{1023} x_n}{1024}$$

[18µ

When the image data A are then stored in the first memory 34, the pupil divider 62 will be receiving the image data B, and the image data B will be corrected and stored in a second memory 35 in the same manner as in the image data A. The data stored in the first memory 34 for the respective sections shown in FIG. 7 will be sent in turn to a contrast discriminator 36, and the section to be used will be determined by the height of the contrast. Now, in case the contrast of the block B is the highest, the number 128 will be given to an addressing means 37. When an initial value of −32 is in an address shifting means 38 and the addressing means 37 designates the address 128 in the first memory 34, the address shifting means 38 will designate the address 96 in the second memory 35. Then the image data $f_A(128)$ and $f_B(96)$ will be put into a subtracting means 39 and the operation of $|f_A(128)-f_B(96)|$ will be carried out through the absolute value circuit 40. Then the image data $|f_A(128)-f_B(96)|$ will be stored in a memory 42 through an adding means 41. When the above is finished, the addressing means 37 will designate the address 129 in the memory 34, the address shifting means 38 will designate the address 97 in the memory 35, thereafter the operation will be performed in the same manner, $|f_A(129)-f_B(97)|$ will be added to the previous data $|f_A(128)-f_B(96)|$ by the adding means 41 and will be stored in the memory 42. Thereafter, this operation will be repeated until the address 255 of the first memory 34 and the correlation operation $$R(-32) = \sum_{X=128}^{255} ABS\{f_A(x) - f_B(x-32)\} \quad (19)$$

will be completed. When this computation is completed, the value of the address shifting means 38 will be −31 and $$R(-31) = \sum_{X=128}^{255} ABS\{f_A(x) - f_B(x-31)\} \quad (20)$$

will be computed. Then, this will continue until the value of the address shifting means 38 becomes 31 and the entire correlation operation $$R(\delta) = \sum_{X=128}^{255} ABS\{f_A(x) - f_B(x+\delta)\} \; -32 \leq \delta \leq 31 \quad (21)$$

will be carried out. Then the correlation $R(\delta)$ in the memory 42 will be compared by the central processing unit 43 and the $\delta$ at which the correlation $R(\delta)$ is minimum will be found and will be made the phase difference amount of the image. Accordingly, the stage driving means 67 will be driven by a corresponding distance focusing.

By the way, in case the de-focus amount is so large that the phase difference amount of $-32<\delta<31$ is short, the addressing means 37 will designate the address 128 in the first memory 34 and the initial value of the address shifting means 38 will be −64. Whenever the respective correlation computations end, 2 will be added and the computations $$\begin{aligned} R(-64) &= |f_A(128) - f_B(128-64)| + \\ & \quad |f_A(130) - f_B(130-64)| + \ldots \\ & \quad + |f_A(382) - f_B(382-64)| \\ R(-62) &= \ldots \\ & \vdots \\ R(60) &= \ldots \end{aligned} \quad (22)$$

will be carried out. This will correspond to using for the image data every element, and the detecting range of the phase difference between the images will become twice as large with the same computational demand but the focusing precision will be $\frac{1}{2}$.

As in the above, the phase difference between two images is computed and the stage driving means 67 is driven for focusing. The above-mentioned operation may be repeated several times for accurate focusing. By the way, the console 71 may indicate the start of focusing and the in-focus state.

By the way, it is needless to say that the present invention can be applied also to an automatic focus detecting device using two image sensor arrays.

What is claimed is:

1. A method of detecting a focus condition of an optical system comprising the steps of:
   sequentially forming two images of an object, said images being transmitted along two different optical paths in said optical system;
   sequentially receiving said two images with a plurality of photosensitive elements, said photosensitive elements being disposed in a plurality of sections, each section having a plurality of said elements; each element outputting a signal corresponding to image light received by said element;
   storing element signals corresponding to said first received image;
   storing element signals corresponding to said second received image;
   calculating an image light contrast for each said section from said stored element signals;
   selecting a section having a highest calculated contrast;
   correlating the stored first image element signals with the stored second image element signals wherein the element signals which are correlated are selected only from said selected section; and
   determining a focus condition of said optical system from said correlated element signals.

2. A method according to claim 1 wherein said calculating step includes the step of calculating image light contrast for each section by utilizing stored element signals from elements in said section which are non-adjacent.

3. A method according to claim 1 wherein said receiving step includes the step of receiving said images with sections of elements which overlap so that at least one element is disposed in two sections.

4. A method according to claim 1 wherein said correlation step includes the steps of:
   shifting said stored first image element signals, one element signal by one element signal, with respect to said stored second image element signals;
   calculating a correlation value for each one element signal shift; and
   selecting a highest correlation value from among the calculated correlation values.

5. A method according to claim 1 wherein calculating step includes the steps of:
   correcting said stored element signals for variations in image light intensity to provide corrected element signals; and
   calculating image light contrast for each said section from the corrected element signals.

6. A method according to claim 1 further including the step of adjusting an element of said optical system in accordance with the determined focus condition to focus said optical system.

7. Apparatus for detecting a focus condition of an optical system comprising:

means for sequentially receiving said two images, said receiving means including a plurality of photosensitive elements, said photosensitive elements being disposed in a plurality of sections, each section having a plurality of said elements; each element outputting a signal corresponding to image light received by said element;

means for forming two images of an object, said images being transmitted along two different optical paths in said optical system;

first memory means for storing element signals corresponding to said first received image;

second memory means for storing element signals corresponding to said second received image;

processing means for (a) calculating an image light contrast for each said section from said stored element signals, (b) selecting a section having a highest calculated contrast, (c) correlating the stored first image element signals with the stored second image element signals wherein the element signals which are correlated are selected only from said selected section, and (d) determining a focus condition of said optical system from said correlated element signals.

8. Apparatus according to claim 7 wherein said processing means includes means for calculating image light contrast for each section by utilizing stored element signals from elements in said section which are non-adjacent.

9. Apparatus according to claim 7 wherein said plurality of photosensitive elements are disposed so that sections of elements overlap to cause at least one element to be disposed in two sections.

10. Apparatus according to claim 7 wherein said processing means performs the functions (c1) shifting said stored first image element signals, one element signal by one element signal, with respect to said stored second image element signals, (c2) calculating a correlation value for each one element signal shift, and (c3) selecting a highest correlation value from among the calculated correlation values.

11. Apparatus according to claim 7 wherein said processing means performs the functions (a1) correcting said stored element signals for variations in image light intensity to provide corrected element signals; and (a2) calculating image light contrast for each said section from the corrected element signals.

12. Apparatus according to claim 7 further including means for adjusting an element of said optical system in accordance with the determined focus condition received from said processing means to focus said optical system.

13. Apparatus according to claim 7 wherein said means for sequentially forming two images includes:

an image forming lens for receiving said images of said object; and pupil divider means for dividing the received light along said two different optical paths.

14. Apparatus according to claim 13 wherein said pupil divider means is positioned at a exit pupil of said image forming lens, and wherein said pupil divider means comprises a rotatable disk having a first half with a semi-circular arcuate transparent portion of large diameter and a semi-circular arcuate opaque portion of small diameter concentric with said large diameter arcuate portion, a second half of said rotatable disk having a semi-circular arcuate opaque portion of said large diameter and a semi-circular arcuate transparent portion of said smaller diameter concentric with said large diameter opaque portion, a boundary line between the transparent and opaque portions of each half of said rotatable disk crossing an optical axis of said image forming lens.

15. Apparatus according to claim 13 wherein said pupil divider means is located at an exit pupil of said image forming lens and comprises a light intercepting sector capable of reciprocating at a constant speed in a predetermined angular range and having an arcuate transparent portion of large diameter and a transparent portion of smaller diameter concentric with said large portion, said transparent portions being positioned respectively on either side of a center line of said sector, an arcuate boundary line between said two transparent portions crossing an optical axis of said image forming lens.

16. Apparatus according to claim 13 wherein said pupil divider means is positioned at an exit pupil of said image forming lens and comprises a pair of light intercepting sectors formed integrally with each other and spaced from each other in a direction of an optical axis of said image forming lens, said light intercepting sectors being reciprocally movable at a constant speed in a predetermined angular range. Each said light intercepting sector comprising an arcuate transparent portion of a large diameter and a arcuate transparent portion of a smaller diameter formed respectively on either side of a center line of each said light intercepting sector, an arcuate boundary line being disposed between said two transparent portions in each of said light intercepting sectors.

* * * * *